United States Patent
Poulis et al.

(10) Patent No.: US 6,377,667 B1
(45) Date of Patent: Apr. 23, 2002

(54) TELEPHONE LINE-ASSIST POWERED APPARATUS WITH PROGRAMMABLE HOLD CURRENT

(75) Inventors: Spiro Poulis, Kearns; John Evans, Riverton; Shane Messerly, Farmington, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/268,610

(22) Filed: Mar. 15, 1999

(51) Int. Cl.$^7$ .............................................. H04M 11/00
(52) U.S. Cl. ..................... 379/93.36; 379/413; 375/222
(58) Field of Search ................ 379/93.36, 93.05–93.07, 379/93.37, 93.28, 93.29, 412, 413; 375/222

(56) References Cited

U.S. PATENT DOCUMENTS

| | | |
|---|---|---|
| 4,395,590 A | 7/1983 | Pierce et al. |
| 5,086,454 A * | 2/1992 | Hirzel ..................... 379/93.36 |
| 5,181,240 A | 1/1993 | Sakuragi et al. |
| 5,528,131 A | 6/1996 | Marty et al. |
| 5,655,010 A * | 8/1997 | Bingel ..................... 379/93.28 |
| 5,790,656 A | 8/1998 | Rahmian et al. |
| 5,809,068 A | 9/1998 | Johnson |
| 5,815,567 A | 9/1998 | Davis et al. |
| 6,212,226 B1 * | 4/2001 | Newton ....................... 379/413 |

* cited by examiner

*Primary Examiner*—Wing F. Chan
(74) *Attorney, Agent, or Firm*—Workman, Nydegger & Seeley

(57) ABSTRACT

A power management circuit for use in a terminal interface device such as a modem which converts available power from a terminal or host device such as a computer into usable standby power for use when the terminal interface device is non-operational. The power management circuit is additionally comprised of a voltage regulator which, when a terminal interface device becomes operational, is enabled and regulates available voltage and current into usable power as available from the interfacing communication network. The preferred embodiment of the power management circuit is further comprised of a programmable hold current generator which enables a terminal interface device incorporating the power management circuit to be compatible with multiple communication networks having diverse hold current specifications. The use of power available from the communication network in generating the operational voltage greatly reduces interference injected onto the communication network.

17 Claims, 2 Drawing Sheets

TELEPHONE LINE-ASSIST POWERED APPARATUS WITH PROGRAMMABLE HOLD CURRENT

BACKGROUND OF THE INVENTION

1. The Field of the Invention

The present invention relates to communication systems and in particular to a communication terminal interface via a terminal interface device to a communication network that presents power to the terminal interface device that may be tapped for operational power.

2. Present State of the Art

Modern data transmission devices such as computers are increasingly used in applications that require exchange of data over a communication network. Popular networks for use in propagating data include well established telephone networks. Such networks were originally designed to accommodate, and therefore propagate, the transmission of voice conversations which include very specific bands of frequencies. Individual countries have implemented unique power and frequency standards relating to their particular implementation of telephone networks.

While the interoperation specifications differ for national telephone networks, they each require the modulation of computer data in order to comply with the individual specific bandwidth requirements. To facilitate the modulation and the complementary demodulation processes, devices known as modems (MOdulate/DEModulate) have become ubiquitous. In order to compatibly interoperate with the telephone network, a modem must perform certain "telephone handset" functions to appear to the telephone network as a legacy telephone handset-compatible device.

One such telephone handset function that the modem must perform is the function of being able to go "off-hook." Off-hook functionality requires the modem to signal the telephone network that information is either going to be sent by the modem to the telephone network or that the modem is ready to receive information from the telephone network. Telephone network specifications typically require that the modem or other terminal device signal an off-hook condition by drawing or sinking a specified amount of current from the telephone network. Traditionally, such drawn current was utilized by a telephone to "power" the telephone during use. In a modem application where a data device such as a computer requires appreciable power, the current drawn by the modem to simulate the off-hook condition was typically unnecessary for the modem and therefore wasted as the modem functionality derived power either from an external independent power supply or by sharing the power supply of the computer or host device.

In the advent of miniaturization, computers have become increasingly more integrated and as such have become more mobile and portable. One overriding design concern with portable computers is power management. In a portable environment, all of the operating power for the computer and any peripheral devices, such as modems, must be resident within the computer. Hence, portable computer batteries are heavily taxed by the data terminal (e.g., computer) functionality. Therefore, any inefficient use of available power affects the overall performance of the communication system (e.g., the data terminal (computer) and the network interface device (modem)).

As briefly alluded to above, modern networks may utilize existing communication networks such as POTS or other international similar networks. POTS provides an archaic interface that requires a specific amount of off hook current to be drawn. Power drawn had heretofore been unusable by devices since older devices required an amount of power for operation beyond what was available. With miniaturization and lower power designs, the available power from, for example, the POTS is sufficient to be employed for useful functionality to power electronic components on a network interface device (e.g., modem).

An additional requirement placed upon a telephone network interface device such as a modem is that the device cannot introduce virtually any noise onto the telephone system. therefore, the use of a transformer for coupling power from the terminal device over to circuitry on the network interface device that interfaces with the telephone network has become unruly and ineffective as frequencies have increased. Alternative coupling techniques and power management architectures are therefore in order.

Thus, what is needed is an apparatus for efficiently utilizing available power in a communication system to more efficiently manage scarce on-board power from a portable device such as a portable computer by utilizing available line power from the communication network during interaction therewith.

What is also needed is a power management architecture that minimizes the amount of noise generated from the circuitry on a network interface device that is injected back onto the communication network.

SUMMARY AND OBJECTS OF THE INVENTION

It is therefore an object of the present invention to provide an efficient power management circuit for incorporating into a terminal or network interface device, (e.g., a modem), that integrates minimal standby power from a data terminal device, (e.g., a computer), with available line current from a communication network, (e.g., a telephone network), in order to adequately power the network interface device with minimal power impact to the data terminal device.

It is yet a further object of the invention to minimize power transforming inefficiencies including the generation of noise associated therewith for an improved system for interfacing with a communication network and complying with the standards as required by communication networks.

It is therefore a further object of the present invention to provide a power circuit for incorporating into a network interface device, such as a modem, that is programmable for compatible operation in various international environments that employ varying communication network specifications including differing line or hold current levels to signal an off-hook condition Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a power circuit apparatus for improving upon power management including the compatible noise parameters associated therewith in network terminal devices, such as modems, that are deployed in portable environments wherein power management is critical is presented. The inventive apparatus includes a power circuit that exacts a fractional amount of data terminal device (e.g., computer) power to maintain minimal standby functionality within the network interface device and employs the otherwise wasted off-hook line current required to signal the, for example, modem's active state to the communication network (e.g., POTS or similar standard).

The power circuit of the present invention, in its preferred embodiment, is comprised of a charge pump powered from standby power received from the data terminal device. The output from the charge pump within the power circuit preferably located within the network interface device is post regulated by a shunt regulator which creates a regulated output voltage for powering the standby circuitry. When the standby circuitry either detects a "ring" signal as dispatched from the communication network or when the data terminal device signals the network interface device (e.g., modem) to open a channel with the communications network for originating a session, the network interface device goes "off-hook." The network interface device initiates an off-hook condition by switching on a voltage regulator located across the communication network terminals. As recalled from is above, the off-hook condition is signaled to the communication network by drawing or sinking a requisite amount of line current, commonly called hold current or line current, from the communication network.

The augmented power supplied by the voltage regulator is converted from the voltage across the communication network terminals (e.g., tip and ring in the POTS environment). Any excess current from the voltage regulator is absorbed by the shunt regulator. Such a novel approach as described herein enables the two individual sources of power (i e., the standby power from the data terminal equipment as converted by the charge pump and the line power from the communication network as regulated by the voltage regulator) to be complementary without introducing contention issues at the regulated output voltage common node.

By using the hold current from the line or communication network side to power the voltage regulator and to supply the majority of the operational power, the inefficiencies associated with a charge pump-only design are minimized. Also, by using power from the line side (e.g., hold current) to power the terminal interface device circuitry during operation, the noise associated with alternative approaches such as transformer coupling of power from the terminal device side is greatly reduced and virtually eliminated.

The present invention also accommodates the multinational nature and use of modern network interface devices by incorporating a programmable hold current sub-circuit that may be programmably altered to conform with varying national standards relating to the requisite hold current that must be drawn from the communication network to signal an off-hook condition.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
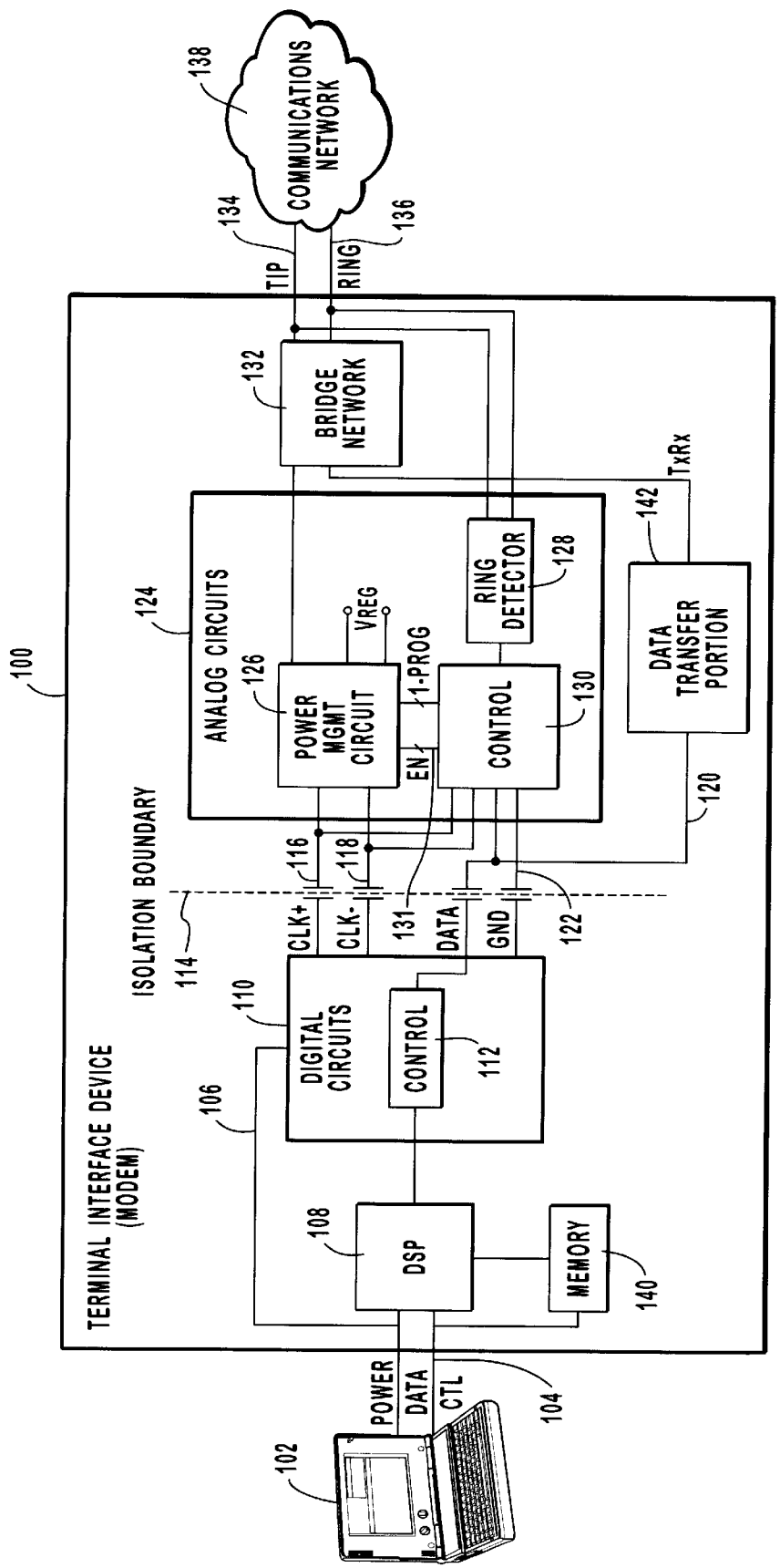
FIG. 1 top level diagram depicting an environment within which the preferred embodiment of the power management circuit of the present invention may be practiced.

The present invention embodies a novel approach for isolating digital and analog portions of a terminal interface device 100 to provide an improved architecture for reducing the possibility of noise injection into a communication network. As depicted in FIG. 1, a terminal device 102, such as a computer, is coupled to a terminal interface device 100 by way of standardized interfaces known by those of skill in the art. Such interfaces may include PCMCIA, ISA, EISA, PCI, MCA interfaces or other parallel or serial interfaces. The interface coupling terminal device 102 with terminal interface device 100 depicts a power signal 106 and data and control signals 104. Those of skill in the art of interface architectures appreciate that such interfaces may include framed serial interfaces as well.

In the preferred embodiment of the present invention, terminal interface device 100 may assume the form of a modem known by those of skill in the art to provide an interface mechanism for transforming the digital-based information of a terminal device, such as a computer, into a propagatable format compatible for transmission onto a computer network. Those of skill in the art of telecommunications appreciate that the frequencies and wave forms associated with the data available on a terminal device are incompatible with the propagation requirements, namely the available bandwidth, associated with a communication network. FIG. 1 depicts a communication network 138 coupling to a terminal interface device 100. In the preferred embodiment, communication network 138 is a telecommunication network such as a public switched telephone network. Again, those skilled in the art of telecommunications appreciate that such communication networks provide an interface similar to that depicted in FIG. 1 which includes tip and ring signals depicted as tip signal 134 and ring signal 136.

Those of skill in the art appreciate that numerous architectures have been developed for the partitioning of functionality within a terminal interface device to accommodate the requirement specifications leveled on terminal interface device manufactures. One such a requirement includes the requirement to provide isolation of a terminal device from the communication network so as not to damage the interface with the communication network. Additionally, for safety reasons, the specification also requires an isolation boundary to protect a user at a terminal device from being subjected to the voltage and current levels presented at the communication network interface which particularly include high voltage and current levels associated with the ring function of the communication network. Yet additional requirements imposed upon terminal interface device manufacturers/designers include requirements that the terminal interface device, including the terminal device, do not inject extraneous noise onto the communication network.

Therefore, designers are required to implement an isolation boundary that meets these specifications, as well as others. FIG. 1 depicts a preferred architecture wherein the majority of terminal interface device digital functions are integrated into a digital circuits portion 110 existing on the host side of an isolation boundary 114. The signals associated with the digital circuit's portion 110 are depicted in FIG. 1 as clock signals 116 and 118, data signal 120 and ground signal 122 which are preferably capacitively coupled across isolation boundary 114 to an analog circuit portion 124 which is located on the line-side of the terminal interface device 100. The analog circuits portion 124 is further comprised of a power management circuit 126 which provides the novel power management techniques of the present invention. Power management circuit 126 is discussed in greater detail in FIG. 2.

Terminal interface device 100 is further comprised of traditional types of functional components such as a digital signal processor 108 optionally coupled to memory 140 for providing modulation and demodulation functionality as well as other circuit control functions. Digital signal processor 108 further couples to a control portion 112 within digital circuit's portion 110 to provide controlling functionality which crosses isolation boundary 114 preferably by way of a digital data stream across data signal 120. The digital control commands passed to a control portion 130 within analog circuit's portion 124 provide enablement signals 131 to power management circuit 126 and for relaying ring detect signals as determined by a ring detector 128. Additional traditional components include a bridge network 132 known by those of skill in the art to provide separation and polarity assignment to interchangeable signals tip 134 and ring 136.

While the architecture as presented in FIG. 1 depicts a preferred embodiment of an environment wherein power management circuit 126 may be integrated, other architectures for terminal interface device 100 are also contemplated which place the isolation boundary at varying places within the topology. Furthermore, other partitions between digital and analog functionality are also contemplated to be within the scope of the present invention which may also employ the novel power management circuit as depicted and described below.

Figure 2:
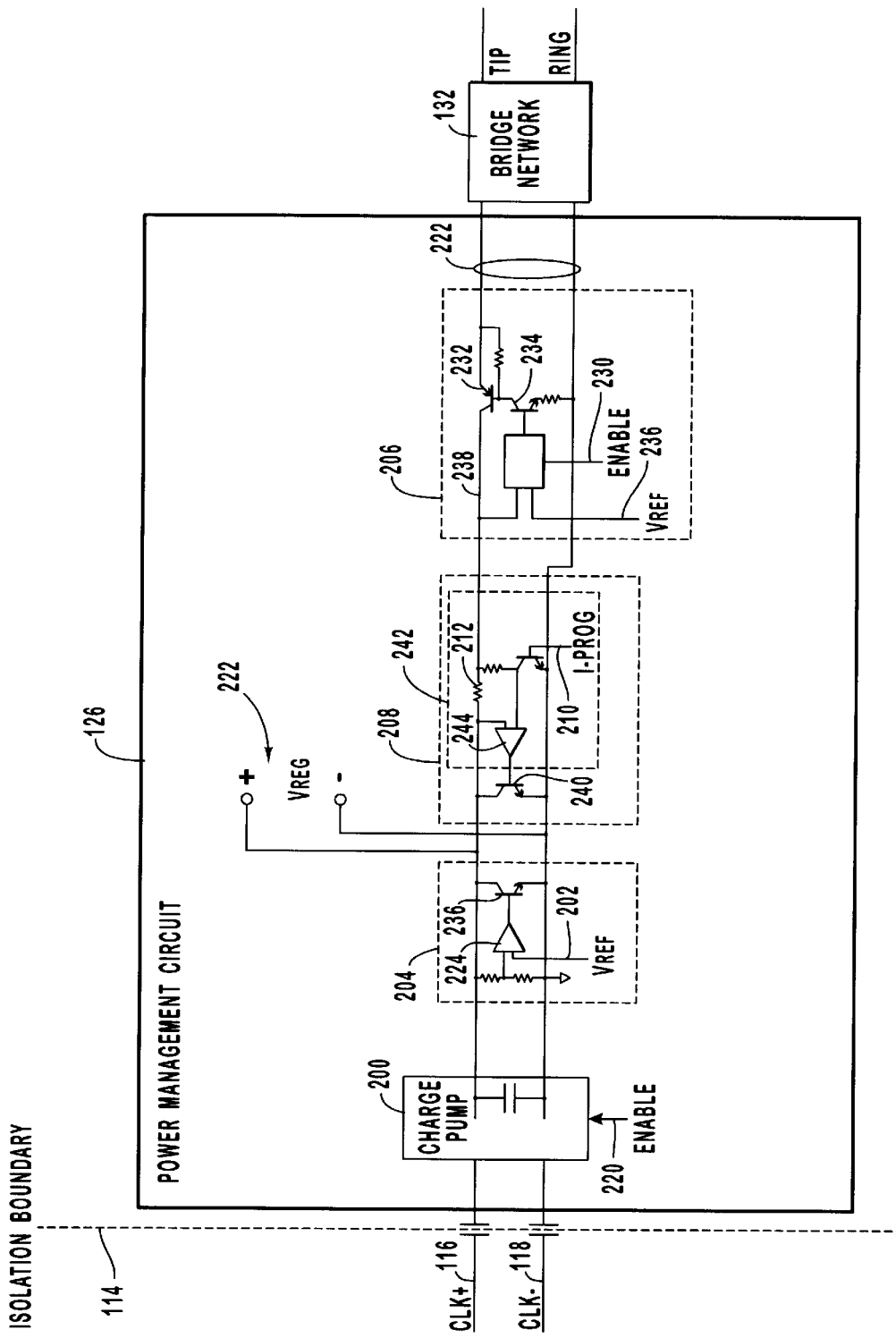
FIG. 2 is a diagram of the power management circuit for providing standby and operational power to the modem, in accordance with the preferred embodiment of the present invention.

FIG. 2 depicts a circuit diagram of the power management circuit 126 in accordance with a preferred embodiment of the present invention. In FIG. 2, clock signals 116 and 118 are depicted as providing standby power to the power management circuit 126 and traversing isolation boundary 114. Power management circuit 126 further receives primary power 222 from the communication network by a tip and ring signal which pass through bridge network 132.

Power management circuit 126 is comprised primarily of a charge pump 200, a shunt regulator 204, a hold current generator 208 and a voltage regulator 206. Charge pump 200 receives standby power from the terminal device which may or may not have limited power capabilities. However, the inefficiencies associated with a charge pump as well as noise restrictions imposed by the communication network, are not conducive for use in generating the entire operational power necessary for powering a data transfer portion 142 of the terminal interface device during full operation. Therefore, charge pump 200 is operatively controlled by an enable signal 220 which enables the charge pump during an "on-hook" state when data is not being exchanged with the communication network. The standby circuitry powered by the charge pump when converting the standby power is typically comprised of those functions necessary for responding to a ring signal sent by the communication network denoting to the terminal device that the communication network desires to communicate thereto, as well as other circuitry which enables the terminal interface device to create an "off-hook" state signaling to the communication network that the terminal device desires to communicate thereto.

Those skilled in the art of power conversion appreciate that charge pumps are both inefficient and generally noisy as well as less effective than desirable at generating a regulated voltage having an adequately precise voltage level. Therefore, in order to protect circuits utilizing regulated power converted by the charge pump, a shunt regulator 204 operates in concert with charge pump 200 for clamping or regulating a regulated output voltage 222. Regulated output voltage 222 forms the operational power which is utilized by both standby circuitry and operational circuitry including the data transfer portion of a terminal interface device associated with transforming and exchanging data between a terminal device and a communication network. Shunt regulator 204 is comprised of a comparative device 224 which creates an output upon the comparison of a voltage reference 202 and a present level of regulated output voltage 222. The output generated by comparative device 224 drives a shunting device depicted as transistor 226. Shunting device 226 sinks current from regulated output voltage 222 to pull the regulated output voltage 222 into a desired compliance as enforced by voltage reference 202. While the present embodiment depicts one implementation of shunt regulator 204, those skilled in the art of power conversion appreciate that other implementations of regulating devices may also be employed within the power management circuit of the present invention without departing from the spirit and scope of the invention.

The inefficiencies of employing a charge pump for use in supplying a totality of operational voltage to a terminal interface device has been described above. In order to overcome the inefficiencies and undesirability of such a charge pump implementation, power management circuit 126 utilizes otherwise wasted available current and voltage provided by the communication network. Those of skill in the art of telephony appreciate that a myriad of communication networks present to a suitable terminal interface device a voltage and current that must be operatively coupled therewith in order to facilitate compatible intercommunication. One particular requirement for compatible interoperation with various communication networks, such as a public switch telephone network, is a requirement that a specific amount of current be drawn from the communication network by a terminal interface device in order to signal to that communication network that the terminal interface device is in an operable state for sending and receiving communication with the network. Most implementations of terminal interface devices have heretofore shunted the requisite signaling current, hereinafter known as "hold current," to electrical ground in a wasteful manner. While the ongoing transformation of terminal devices to more portable and power-conscious implementations have been described above, the utilization of otherwise wasted power available from the communication network may provide a supplemental source of power for use by such portable and power-savvy terminal interface devices. Additionally, for terminal interface devices which have available to them a generally unlimited amount of power for supplying as standby power to a terminal interface device, the present power management circuit also provides a means for minimizing injection of noise onto the communication network by utilizing hold current from the communication network for powering circuitry on the line-side (e.g., communication network side) of the isolation boundary of the terminal interface device.

Referring to FIG. 2, the power management circuit 126 through the use of voltage regulator 206 converts primary power 222 in the form of hold current and available line voltage into operational power for use by the terminal interface device including data transfer portions therein. When the terminal interface device either detects a valid ring signal received from communication network by a ring detector 128 (FIG. 1) or when terminal device 102 signals to terminal interface device 100 that terminal device 102 desires to initiate a communication session with the communication network, control circuitry 130 ( FIG. 1) initiates an enable signal 230 which enables the voltage regulator circuitry to pass current from the communication network into voltage regulator 206. In the preferred embodiment, voltage regulator 206 is comprised of transistors 232 and 234 which operate in conjunction with a voltage reference 236 and a regulated primary power signal 238 to determine the corresponding drive levels for transistors 232 and 234. It should be appreciated that when an enable signal 230 is activated, thereby passing primary power 220 into the power management circuit for regulation into regulated output voltage 222, the charge pump enable signal 220 is deactivated in one respect to minimize standby power consumption due to the inefficiencies of charge pump technology and in another respect to minimize noise induction from the standby power and charge pump onto the line side (e.g., communication network side) of the isolation boundary.

It should be recalled that various communication network specifications require a specific amount of "hold current" to be drawn from the communication network is tip and ring signals in order to signal to the communication network the operational state of terminal interface device 100. To accommodate the precise current draw associated with a communication network's hold current specifications, a hold current generator 208 is integrated into power management circuit 126. It should be appreciated that the current sunk by hold current generator 208 is not equivalent to the hold current specification required by the communication network as a portion of the current passing from the primary power 222 is utilized by operational circuitry powered by regulated output voltage 222. Additionally, the current requirements of the operational data transfer portion are readily calculable resulting in a difference amount that is necessary to be sunk by hold current generator 208. Therefore, the amount of current sunk by hold current generator 208 is a fractional portion of the hold current specification.

Hold current generator 208 is comprised of a hold current shunt regulator 240, implemented in FIG. 2 as a transistor, and a sense portion 242 comprised of a comparative device 244 and resistive components, one of which is resistive element 212.

In one preferred embodiment of power management circuit 126, the sense portion 242 of hold current generator 208 may be comprised of a fixed resistive network enforcing a specific hold current value corresponding to a specific communication network specification. Another preferred embodiment employs a variable component which enables the power management circuit to interact in various communication networks supporting a myriad of hold current ranges. The programmable or variable embodiment is depicted in FIG. 2 wherein a programmable input 210 may be driven at various levels thereby varying the input values exhibited at comparative element 244 which in turn drives hold current shunt regulator 240. Programmable input 210 is varied by control signals received from control block 130 (FIG. 1) as ultimately configured and specified by terminal device 102 (FIG. 1) by digital signal processor 108, control block portion 112, and data signal 120 (all illustrated in FIG. 1). It should be appreciated that the inventive variable hold current embodiment enables the power management circuit and hence the terminal interface device to be configured for operation within various communication networks including various nationalities' public switch telephone networks making a terminal interface device comprised of the power management preferred embodiment depicted in FIG. 2 an internationally compatible terminal interface device.

A power management circuit capable of integration within a terminal interface device, including a modem, has been presented which utilizes standby power available from, a terminal device for powering minimal circuitry required to "awake" the terminal interface device when interaction between a terminal device and a communication network has been presented. During the "on-hook" or standby state, the power management circuit provides power from the host side (e.g., terminal device side) of the isolation barrier to power the standby or idle circuitry. Additionally in the "off-hook" state, the voltage regulator operatively coupled across the primary power terminals (e.g., the tip and ring signals via a bridge network) are switched on and employed to power the remaining circuitry via a regulated output voltage. Any excess current generated by the voltage regulator is absorbed by the shunt regulator. Such an approach enables the two sources of power to be complimentary without introducing contention issues at the regulated output voltage node. The voltage regulator and the charge pump are oppositely enabled and disabled to minimize noise distortions. Additionally, a programmable input is supported which enables the hold current to be compatibly varied in accordance with the specific requirement of an interfacing communication network.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a terminal interface device, a power management circuit for alternatively combining primary power available from a communication network with standby power available from a terminal device to provide a regulated output voltage for alternatively operating a data transfer portion circuitry and standby circuitry, said terminal interface device for operatively coupling said terminal device with said communication network, said primary power being available to said power management circuit when said terminal device and said communication network interact, said power management circuit comprising:
   a. a charge pump electrically coupled to said standby power of said terminal device for receiving said standby power and converting said standby power to a regulated output voltage;
   b. a shunt regulator electrically coupled to said regulated output voltage to regulate said regulated output voltage by shunting to ground excess current from said charge pump;
   c. a voltage regulator at least indirectly electrically coupled to said communication network to convert, when said voltage regulator is enabled, said primary power available from said communication network directly into regulated primary power which indirectly becomes said regulated output voltage; and
   d. a hold current generator electrically coupled between said regulated primary power of said voltage regulator and said regulated output voltage as controlled by said shunt regulator.

2. In a terminal interface device, the power management circuit as recited in claim 1, wherein said hold current generator further comprises:
   a. a sense portion directly electrically coupled to said regulated primary power of said voltage regulator to control said hold current shunt regulator to sink excess regulated primary power, said sense portion controlling said primary power drawn from said communication network signaling to said communication network an operational state of said data transfer portion; and
   b. a hold current shunt regulator electrically coupled and driven by said sense portion for sinking an amount of current as required by said communication network in order signal an operational state of said terminal interface device to said communication network.

3. In a terminal interface device, the power management circuit as recited in claim 2, wherein said shunt regulator and hold current shunt regulator of said hold current generator being a single shunt regulator having multiple control inputs, one for regulating said regulated output voltage and one for specifying the hold current.

4. In a terminal interface device, the power management circuit as recited in claim 1, wherein said hold current generator further comprises:
   a. a programmable input to control said hold current shunt regulator to variably sink excess regulated primary power thereby variably signaling to said communication network an operational state of said data transfer portion according to variable global standards of said communication network for a specified hold current comprised of said excess regulated primary power and said operational power.

5. In a terminal interface device, the power management circuit as recited in claim 1, wherein said terminal interface device is a modem for interfacing between said terminal device and said communication network.

6. In a terminal interface device, the power management circuit as recited in claim 5, wherein said modem is compatible for interfacing with said communication network including a public switched telephone network and said terminal device including a computer.

7. In a terminal interface device, the power management circuit as recited in claim 1, wherein said charge pump is capable of converting said standby power into said regulated output voltage when said standby power is presented by said terminal device as a differential clock signal.

8. In a terminal interface device, the power management circuit as recited in claim 1, wherein said charge pump and said voltage regulator are each comprised of an enable input that alternatively enables and disables the other.

9. A terminal interface device for interfacing a terminal device with a communication network, said terminal device being capable of supplying standby power and said communication network being capable of supplying primary power, said terminal interface device comprising:
   a. a power management circuit for alternatively combining said primary power available from said communication network with said standby power available from said terminal device to provide a regulated output voltage for alternatively operating a data transfer portion circuitry and standby circuitry, said primary power being available to said power management circuit when said terminal device and said communication network interact; and
   b. a data transfer portion electrically and operably coupled with said power management circuit for exchanging data between said communication network and said terminal device.

10. The terminal interface device, as recited in claim 9 wherein said power management circuit further comprises:
   a. a charge pump electrically coupled to said standby power of said terminal device for receiving said standby power and converting said standby power to a regulated output voltage;
   b. a shunt regulator electrically coupled to said regulated output voltage to regulate said regulated output voltage by shunting to ground excess current from said charge pump;
   c. a voltage regulator at least indirectly electrically coupled to said communication network to convert, when said voltage regulator is enabled, said primary power available from said communication network directly into regulated primary power which indirectly becomes said regulated output voltage; and
   d. a hold current generator electrically coupled between said regulated primary power of said voltage regulator and said regulated output voltage as controlled by said shunt regulator.

11. The terminal interface device, as recited in claim 10 wherein said hold current generator further comprises:
   a. a sense portion directly electrically coupled to said regulated primary power of said voltage regulator to control said hold current shunt regulator to sink excess regulated primary power, said sense portion controlling said primary power drawn from said communication network signaling to said communication network an operational state of said data transfer portion; and
   b. a hold current shunt regulator electrically coupled and driven by said sense portion for sinking an amount of current as required by said communication network in order signal an operational state of said terminal interface device to said communication network.

12. The terminal interface device as recited in claim 11, wherein said shunt regulator and hold current shunt regulator of said hold current generator being a single shunt regulator having multiple control inputs, one for regulating said regulated output voltage and one for specifying the hold current.

13. The terminal interface device as recited in claim 10, wherein said hold current generator further comprises:
   a. a programmable input to control said hold current shunt regulator to variably sink excess regulated primary power thereby variably signaling to said communication network an operational state of said data transfer portion according to variable global standards of said communication network for a specified hold current comprised of said excess regulated primary power and said operational power.

14. The terminal interface device as recited in claim 10, wherein said terminal interface device is a modem for interfacing between said terminal device and said communication network.

15. The terminal interface device as recited in claim 14, wherein said modem is compatible for interfacing with said communication network including a public switched telephone network and said terminal device including a computer.

16. The terminal interface device as recited in claim 10, wherein said charge pump is capable of converting said standby power into said regulated output voltage when said standby power is presented by said terminal device as a differential clock signal.

17. The terminal interface device as recited in claim 10, wherein said charge pump and said voltage regulator are each comprised of an enable input that alternatively enables and disables the other.

* * * * *